Patented Apr. 9, 1940

2,196,238

UNITED STATES PATENT OFFICE 2,196,238

METHOD FOR TREATING INTESTINES

Albert Benjamin Werby, Brookline, Mass., assignor to Fuerchtegott Willy Jaeger, Jamaica Plain, Mass.

No Drawing. Application August 11, 1938,
Serial No. 224,399

4 Claims. (Cl. 149—1)

This invention relates to methods of treating the intestines of hogs, sheep, and other animals for the purpose of preserving them and partially dehydrating them and condensing them into relatively smaller dimensions in volume for packaging and shipment in such manner that they can subsequently be readily expanded by hydration to a predetermined capacity without perforation or substantial deterioration of the tissue thereof.

Intestines when properly cleaned are used for sausage casings, catgut, surgical gut, etc., and it is important that they be properly preserved so that they will be in a sanitary condition when required for use.

Inasmuch as the intestines are most commonly used in the trade as containers for sausage and are known in the trade as "casings," they will be so referred to herein.

The common way of preserving casings is to clean them thoroughly and then pack them in salt (NaCl) or a salt solution, and while this salt method of preserving casings keeps them in a sanitary condition, it has the disadvantage that the salt crystals frequently produce numerous punctures in the casings, especially when bundles of salt preserved casings are tightly packed in a barrel or other container for shipment.

Furthermore, salt preserved casings are apt to develop defects known as "salt spots" as the chloride ingredient of the salt when liberated by chemical action has a weakening effect upon the tissue of the casings.

Casings in their normal state contain a large percentage of water which cannot be removed from salt preserved casings by application of pressure and as a result the water ingredient of the casing accounts for a large proportion of the weight and bulk of the salt preserved casings.

Another object of my invention is to provide an improved method of preserving casings according to which the casings are not only preserved in a sanitary condition without loss of tensile strength, but a large portion of the water ingredient is removed so that a bundle or package containing a given length of casing which has been treated in accordance with my invention will be so condensed as to have only a fraction of the weight and bulk of a similar amount of salt preserved casing.

It has heretofore been recognized that by treating intestines with an alum salt solution some condensation or shrinking may be produced but that when such condensation is effected the wall of the casing will remain in substantially condensed form and may not thereafter be effectively expanded to natural size. By treating intestines in accordance with the present invention, the casing is shrunk diametrically so that it has only a fraction of the size or diameter that it had before being treated. The ingredients used in thus treating the casings according to the present invention are water soluble, so that while they are shrunk or condensed by the removal of the greater portion of the water content, yet the shrinkage is a temporary and not a permanent one and when the casings are subjected to treatment by water when about to be used, the ingredients which caused the shrinkage may be dissolved to such a degree as to enable the casings to expand to a predetermined diameter or to their normal size.

In carrying out my invention, the intestines are thoroughly cleaned in the usual manner and are then placed in a solution containing an ingredient or ingredients which have the effect of removing a large part of the water from the casings thereby shrinking the latter. The solution also contains other ingredients which have the effect of preserving the casing.

The ingredients which I prefer to use for effecting the temporary or non-permanent condensation or shrinking of the casings and the removal of the water therefrom comprises a weak organic acid such as tartaric acid, citric acid, lactic acid or an organic acid salt such as potassium acid tartrate or a combination thereof such as is permissible in connection with the treatment of food products.

The weak organic acid or acid salt acts upon the casings as an astringent which effects or develops osmosis to such an extent that the water which is held in the casings as a constituent part thereof readily leaves the casings or can be expelled therefrom by the application of slight pressure without injury to the tissue of the casing. The ingredients I prefer to use to give the preserving quality to the solution are sodium nitrate and magnesium sulphate, and if desired, a trace of alum may be used. These chemicals do not affect the decreasing of the bulk or mass of the intestines, but have the effect of preventing the development of bacterial life in the casings and keeping the same for a long period of time by thus preventing decomposition or putrefaction.

The present process, desirably, is performed at usual room temperature, thereby avoiding weakening of the intestines which would occur by reason of coagulation of the wall of the intestine which might occur if a relatively high temperature were employed.

A satisfactory solution for treating casings in accordance with my improved method may be made by dissolving in two gallons of water, one pound of the salts comprised in either of the following formulas, it being understood that the relative proportion of the ingredients may be varied within reasonable limits to produce the most effective results upon the particular characteristics of the casings to be treated:

*Formula 1*

| | Parts by weight |
|---|---|
| Tartaric acid | 6 |
| Potassium acid tartrate | 4 |
| Sodium nitrate | 30 |
| Magnesium sulphate | 61 |
| Alum (potash) | 1 |
| | 102 |

*Formula 2*

| | Parts by weight |
|---|---|
| Tartaric acid | 3 |
| Citric acid | 3 |
| Potassium acid tartrate | 4 |
| Sodium nitrate | 28 |
| Magnesium sulphate | 63 |
| Alum (potash) | 1 |
| | 102 |

In carrying out my invention, a solution is made by adding one pound of a mixture made according to either of the formulas to two gallons of water. The washed and cleaned intestines are placed in this solution for a suitable length of time and the solution caused thoroughly to permeate the walls thereof. As stated above, the effect of the acid content of the solution is to cause condensation or diametrical shrinkage of the casings and the removal of water thereof by osmosis and the effect of the sodium nitrate and magnesium sulphate ingredients is to prevent the development of bacterial life in the casings and thus preserve them in a sanitary condition.

Intestines in their normal state contain a large proportion of water, usually from ninety to ninety-five percent. By the present method, it is possible to remove from fifty to seventy-five percent of the available water of the intestines and the bulk thereof may be reduced by my method to a small fraction of the original size, thereby greatly economizing the space required for packaging and the cost of transportation as compared with casings treated in the usual salt preserving manner.

Casings treated by the method above described are preserved for a long period of time and when used may be expanded to a predetermined degree by treatment with plain water.

Inasmuch as the condensation or shrinkage of the intestines is produced by water soluble salts, the degree of expansion of the intestines may be controlled by the length of time to which they are subjected to water and, as a consequence, predetermined diameter may be produced according to the size of the sausage which it is desired to manufacture. Inasmuch as the ingredients which may be retained in partially expanded casings are not harmful to health, such control of the diameter of the casing is greatly advantageous in the manufacture of sausage and other food products which are enclosed within the casing.

Casings treated in the manner above-described are greatly advantageous over the salt preserved casing for the reason that the ingredients of the solution are fully dissolved in water and contain no particles which puncture casings nor chlorine salts which would have the effect of producing the so-called weakened "salt spots" in the casing which results from the usual method of treating casings above-described.

Where the intestines are to be used for surgical gut, catgut, for tennis racquet strings, strings for violins and other "wood" musical instruments, no treatment by water to remove the soluble salts of the shrunken or condensed intestines may be required, or at least only such treatment as may properly condition the intestines for stretching, twisting and such other treatment as is commonly employed in the manufacture of these articles.

It will be readily understood that the relative proportions of the soluble salts herein specifically set forth in the respective formulas may be varied or that chemical equivalent salts may be employed within the meaning and scope of the following claims.

Having thus described the invention, what I claim as new, and desired to be secured by Letters Patent, is—

1. The method of treating and preserving cleaned intestines which comprises producing a non-permanent shrinkage of the intestines by subjecting them to the action of a water soluble organic acid solution containing tartaric acid and potassium acid tartrate and which is effective to condense the walls of the intestines, and also subjecting the intestines to the action of sodium nitrate and magnesium sulphate in the proportions of approximately two parts magnesium sulphate to one part of sodium nitrate.

2. The method of treating cleaned intestines which comprises producing a shrinkage of the intestines by subjecting them to the action of a water soluble organic acid solution containing tartaric acid and potassium acid tartrate and which is effective to condense the walls of the intestines by the action of osmosis, simultaneously subjecting the intestines to the action of sodium nitrate and magnesium sulphate in approximately the proportions of two parts of magnesium sulphate to one part of sodium nitrate, and subsequently restoring the intestines to approximately their original size and washing therefrom with water the organic acid solution and any salts derived from said solution.

3. The method of treating cleaned intestines which consists in treating the intestines by subjecting them to the action of a solution comprising two gallons of water and one pound of the following salts in substantially the proportions specified:

| | Parts by weight |
|---|---|
| Tartaric acid | 6 |
| Potassium acid tartrate | 4 |
| Sodium nitrate | 30 |
| Magnesium sulphate | 61 |
| Alum (potash) | 1 |

4. The method of treating cleaned intestines which consists in treating the intestines by subjecting them to the action of a solution comprising two gallons of water and one pound of the following salts in substantially the proportions specified:

| | Parts by weight |
|---|---|
| Tartaric acid | 3 |
| Citric acid | 3 |
| Potassium acid tartrate | 4 |
| Sodium nitrate | 28 |
| Magnesium sulphate | 63 |
| Alum (potash) | 1 |

ALBERT BENJAMIN WERBY.